United States Patent

[11] 3,559,844

| | | |
|---|---|---|
| [72] | Inventor | Seymour Schlosberg<br>East Brunswick, N.J. |
| [21] | Appl. No. | 832,915 |
| [22] | Filed | June 13, 1969 |
| [45] | Patented | Feb. 2, 1971 |
| [73] | Assignee | R. Gelb & Sons, Inc.<br>a corporation of New Jersey |

[54] MANHOLE PROTECTION RING
8 Claims, 4 Drawing Figs.

[52] U.S. Cl............................................. 220/63,
220/73
[51] Int. Cl..................................................B65d 25/14,
B65d 25/34, B65d 7/42
[50] Field of Search........................................... 220/63, 65,
73, 24

[56] References Cited
UNITED STATES PATENTS

| 2,970,042 | 1/1961 | Lagerwey................. | 220/63X |
| 3,079,038 | 2/1963 | Rossi et al.................. | 220/73 |
| 3,349,951 | 10/1967 | Peterson..................... | 220/63 |

*Primary Examiner*—George T. Hall
*Attorney*—Pennie, Edmonds, Morton, Taylor and Adams ABSTRACT: A protection ring for a manhole of a glass-lined vessel includes an annular body member and a replaceable impact member releasably secured in a lateral surface recess of the body member.

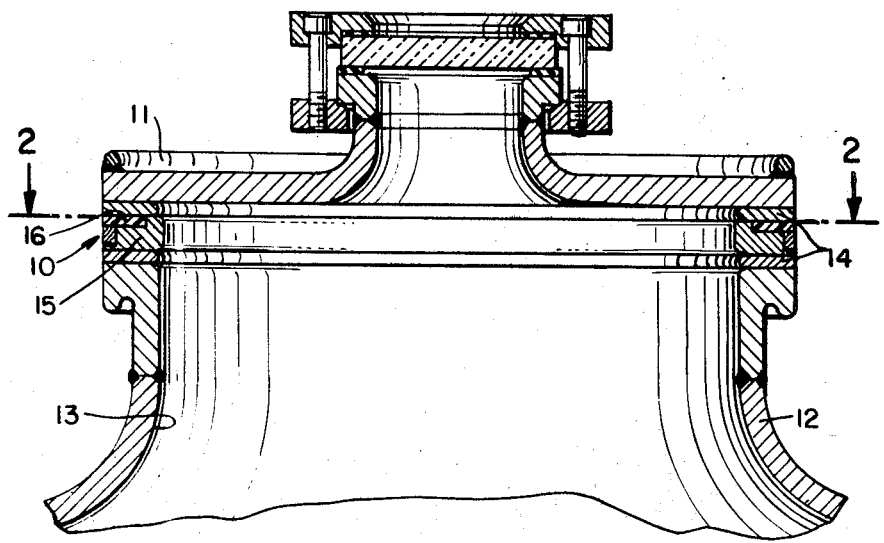
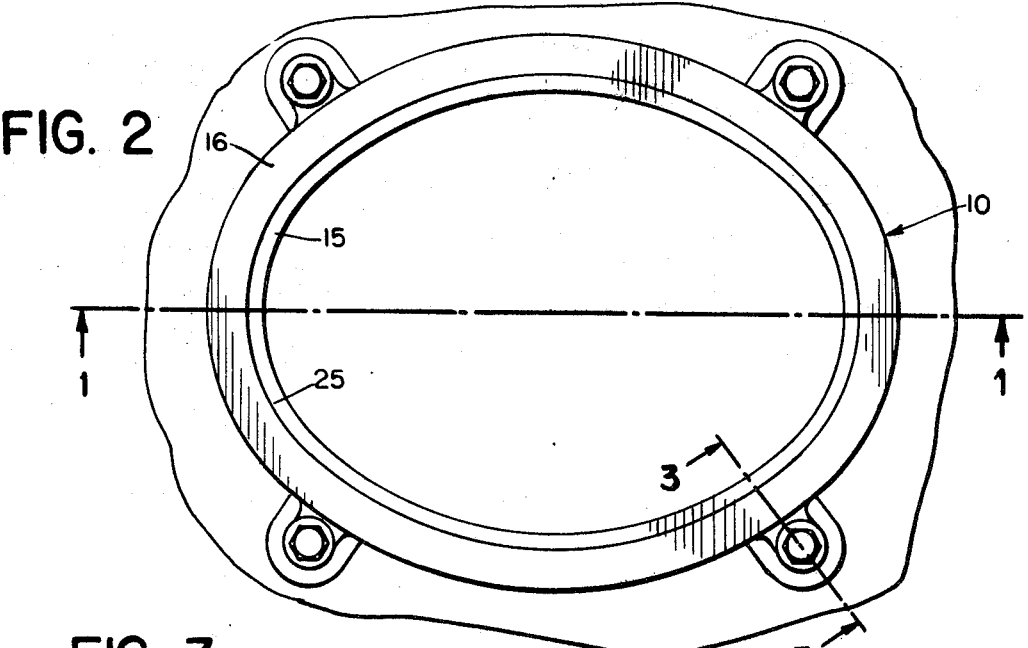
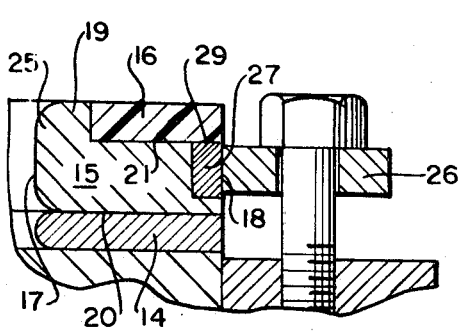
INVENTOR
SEYMOUR SCHLOSBERG

MANHOLE PROTECTION RING

BACKGROUND OF THE INVENTION

This invention relates to a manhole protection device and, more particularly, to a manhole protection ring construction for use with glass-lined tanks and reactors which includes a replaceable impact member secured to the ring body.

The phenomenal growth of the organic chemical industry has greatly increased the demand for high output glass-lined reactors capable of handling extremely corrosive materials. Reactor jackets, glass linings, and fittings have been improved but that portion of the lining adjacent any opening, particularly the manhole or charging port, is especially vulnerable to damage. Annular protection rings have been used to protect the glass lining at these critical areas but, very often, the protection ring itself is damaged by workmen charging the reactor and once the ring suffers an injury sufficient to impair the vessel seal, it must be replaced before the vessel can be used.

Although a damaged ring may be replaced readily, the difficulties encountered both in obtaining prompt repair service and in restocking such parts have compelled chemical manufacturers to carry large supplies of costly protection rings. Smaller manufacturers, in particular, are caught in the squeeze between large inventory overhead and substantial loss of production should a reactor be idled for want of a proper size ring.

SUMMARY OF THE INVENTION

The manhole protection ring of the present invention which is particularly suitable for use with a glass-lined vessel comprises an annular body member of substantial thickness. A portion of an exposed lateral surface of the body member has a recess which extends from radially outwardly of the inner peripheral surface of the body to the outer peripheral surface of the body. An impact member which is releasably secured to the body at the recessed portion of the exposed lateral surface is configured to complement the recessed portion. The ring is secured to the vessel by conventional means.

The present protection ring is light in weight yet has sufficient strength and resiliency to absorb shocks, blows, and other general in-service abuse without the need for frequent replacement. The impact member, in particular, is suitably reinforced to withstand such damage. The ring material should be inert to the chemicals being reacted. MOst importantly, however, because the impact member of the present protection ring may be replaced without removal or replacement of the entire ring assembly, repair service is simplified, down time is reduced, and expensive inventory is eliminated.

BRIEF DESCRIPTION OF THE DRAWINGS

FIG. 1 is a partial cross-sectional view of the manhole portion of a chemical reactor taken substantially along line 1–1 of FIG. 2;

FIG. 2 is a partial plan view of the manhole of a chemical reactor having a protection ring of the present invention in place, the view being taken substantially along line 2–2 of FIG. 1;

FIG. 3 is a sectional view of the ring of the invention taken substantially along line 3–3 of FIG. 2; and FIG. 4 is a sectional view of an alternate embodiment of the present manhole protection ring.

DESCRIPTION OF THE PREFERRED EMBODIMENT

With reference to FIG. 1, a manhole protection ring 10 of the present invention is secured intermediate a manhole cover 11 and a manhole of a vessel 12 having a glass lining 13 in a manner so that when the cover 11 is lifted, the ring 10 remains in place to frame and to protect that portion of the glass lining 13 adjacent the manhole. Gaskets 14 are positioned between the cover 11 and the ring 10 and between the ring and the manhole.

The manhole protection ring 11 comprises an annular body 15 and an impact member 16 releasably secured to the body member 15. These members 15 and 16 may be of any material which is substantially inert to the chemicals being reacted and compatible with the glass lining material commonly used in such chemical reactors and tanks. It is preferred that the members 15 and 16 be of a material which is resilient, shock absorbent, and of sufficiently high impact strength to absorb normal abuse. The fluorocarbon resins and, in particular, polytetrafluoroethylene are especially suitable although it should be recognized that such material may react chemically with certain fluorine compounds. The impact member 16 is preferably reinforced to provide additional strength. The body member 15 may also be reinforced but its reinforcement need not be as great as that for the impact member 16 which receives directly most of the punishment visited upon the ring 10. The reinforcing material should meet the criteria of inertness and compatibility set out above. Glass fiber is particularly suitable as a reinforcing material. Excellent results have been obtained by fabricating the members 15, 16 from polytetrafluoroethylene having respectively approximately 15 percent and 25 percent by weight of glass fiber. Such material can be molded or otherwise formed into the desired shape.

Referring particularly to FIG. 3, the body member 15 includes an inner peripheral surface 17, an outer peripheral surface 18, and a substantial radial breadth defined therebetween. The body member 15 is also of substantial thickness as defined between an exposed lateral surface 19 and an opposite lateral surface 20, respectively. In the preferred embodiment, a portion of the exposed lateral surface 19 has a recess 21 which extends from a locus 22 radially outwardly of the inner peripheral surface 17 to the outer peripheral surface 18. A lip 25 which is defined radially inwardly of the recess 21 is preferably continuous as shown in FIG. 2 but may be noncontinuous, that is, in the form of flanged portions protruding at intervals about an inner portion of the exposed surface, if desired.

The impact member 16 is releasably secured to the body member 15 at the recessed portion 21, and as shown best in FIG. 3, is configured so as to complement the recessed portion 21. The impact member 16 may be secured in place by adhesive, interlocking peg and socket, or other suitable means consistent with the requirement that the impact member 16 be readily releasable from the body member 15.

Means 26 for securing the ring 10 to the vessel 12 are also provided. Such means may be integral with the body member 15 or, as shown in FIGS. 3 and 4, may be separable therefrom. In the latter instance, securing means 26 may be provided on a band 27 which is configured to fit closely about the annular body member 15 at a recess 29 defined in the outer peripheral surface 18 thereof. The recess 29 of FIG. 3 is defined by an additional reduction in the thickness of the body member 15 radially outwardly of the lateral recess 21. Alternatively, as shown in FIG. 4, the recess may be a groove 31 in the periphery of the body member 15.

The ring 10 may be of any desired cross section compatible with its stated functions of sealing and protecting the vessel. Such cross section includes the composite cross sections of the body member 15 and the impact member 16, as assembled, and also, the band 27, if provided. Although the impact member 16 and the band 27 may be configured in any manner to fit and to complement their respective recesses 21, 29 or 31 in the body member 15, preferably the impact member 16 and the band 27 should be substantially rectangular in cross section to complement right angle recesses.

The manhole protection ring 10 of the present invention may be releasably affixed to the glass-lined chemical reactor 12 at the manhole to protect the reactor lining 13 against damage. Such reactors, which form no part of the present invention, are of the type having inner and outer jackets, a glass lining on the inner jacket surface, and inlet and outlet means including a manhole and a manhole cover. Because of its strength and resilience, the ring 10 of the present invention will absorb the considerable abuse attendant in the process of charging the reactor and, accordingly, it need be replaced only in the event that one of its members 15, 16 or 26 becomes so damaged to the extent that an effective sealing of the reactor 12 or protection of the lining 13 is not possible. In most instances, it is anticipated that replacement of just the impact member 16 shall be sufficient to restore the reactor 12 to service.

I claim:

1. A protection ring for a manhole of a glass-lined vessel comprising an annular body member of substantial thickness, a portion of an exposed lateral surface of the body having a recess extending from radially outwardly of an inner peripheral surface of the body to an outer peripheral surface of the body, an impact member releasably secured to the body at the recessed portion of the exposed lateral surface, the impact member being configured to complement the recessed portion, and means for securing the ring to the vessel.

2. A manhole protection ring as in claim 1, wherein the body member and impact member are of polytetrafluoroethylene.

3. A manhole protection ring as in claim 1, wherein the impact member comprises reinforced polytetrafluoroethylene.

4. A manhole protection ring as in claim 3, wherein the impact member is reinforced with a glass fiber material which comprises approximately 25 percent by weight of the impact member.

5. A manhole protection ring as in claim 1, wherein the body member comprises reinforced polytetrafluoroethylene.

6. A manhole protection ring as in claim 5, wherein the body member is reinforced with a glass fiber material which comprises approximately 15 percent by weight of the body member.

7. A manhole protection ring as in claim 1, wherein the outer peripheral surface has a recess and the means for securing the ring to the vessel include a band releasably secured to the body member in the outer peripheral recess.

8. In combination with a chemical reactor including inner and outer jackets, a glass lining on the inner jacket surface, and having an annular manhole and a manhole cover, a manhole protection ring comprising an annular body member of substantial thickness, a portion of an exposed lateral surface of the body having a recess extending from radially outwardly of an inner peripheral surface of the body to an outer peripheral surface of the body, an impact member releasably secured to the body at the recessed portion of the exposed lateral surface, the impact member being configured to complement the recessed portion, and means for securing the ring to the vessel.

Disclaimer and Dedication

3,559,844.—*Seymour Schlosberg*, East Brunswick, N.J. MANHOLE PROTECTION RING. Patent dated Feb. 2, 1971. Disclaimer and Dedication filed Mar. 14, 1986, by the assignee, *De Dietrich (USA), Inc.*

Hereby disclaims and dedicates to the Public the remaining term of said patent.

[*Official Gazette May 13, 1986.*]